United States Patent [19]
McDermott

[11] Patent Number: 5,136,475
[45] Date of Patent: Aug. 4, 1992

[54] EMERGENCY LIGHT FOR MARKING OF AIRCRAFT LANDING SITES AND OTHER PURPOSES

[76] Inventor: Kevin McDermott, 196 Phillips Dr., Hampstead, Md. 21074

[21] Appl. No.: 605,242

[22] Filed: Oct. 29, 1990

[51] Int. Cl.⁵ ............................................. F21L 7/00
[52] U.S. Cl. ..................... 362/158; 362/186; 362/190; 362/207; 362/390; 340/908
[58] Field of Search ............ 362/157, 158, 186, 207, 362/190, 390, 268; 116/202; 200/60; 340/321, 908

[56] References Cited

U.S. PATENT DOCUMENTS

| | | | |
|---|---|---|---|
| 2,753,442 | 7/1956 | Wiswell | 362/186 |
| 2,949,531 | 8/1960 | Lemelson | 362/186 |
| 3,054,088 | 9/1962 | Shwisha | 340/321 |
| 3,202,979 | 8/1965 | Lemelson | 340/321 |
| 3,531,637 | 9/1970 | Nathanson | 362/186 |
| 3,622,979 | 11/1971 | Dickerson | 340/321 |
| 4,086,454 | 4/1978 | Bluhm | 200/60 |
| 4,142,179 | 2/1979 | Lowndes | 340/321 |
| 4,286,310 | 8/1981 | Brainkel | 362/186 |
| 4,428,034 | 1/1984 | Seller | 362/186 |
| 4,563,668 | 1/1986 | Martino | 362/194 |

FOREIGN PATENT DOCUMENTS 521613  5/1940  United Kingdom ................ 362/186

Primary Examiner—Ira S. Lazarus
Assistant Examiner—Sue Hagarman
Attorney, Agent, or Firm—Leonard Bloom

[57] ABSTRACT

An improved marker light for temporary or emergency use in delineating the boundaries of safe aircraft landing areas and for other signalling purposes, the marker light having a cylindrical housing secured to the exterior of a ballast bag and provided with a lamp assembly and cover, the marker light being activated by rotation of the cover.

59 Claims, 6 Drawing Sheets

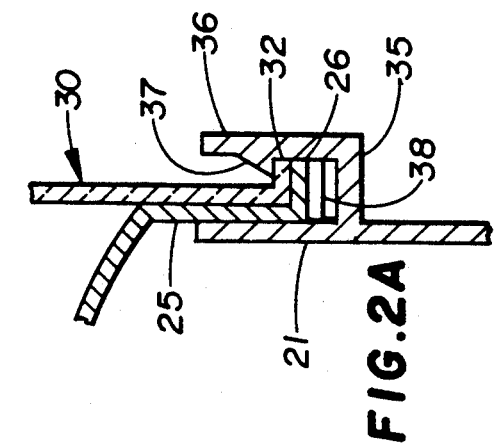
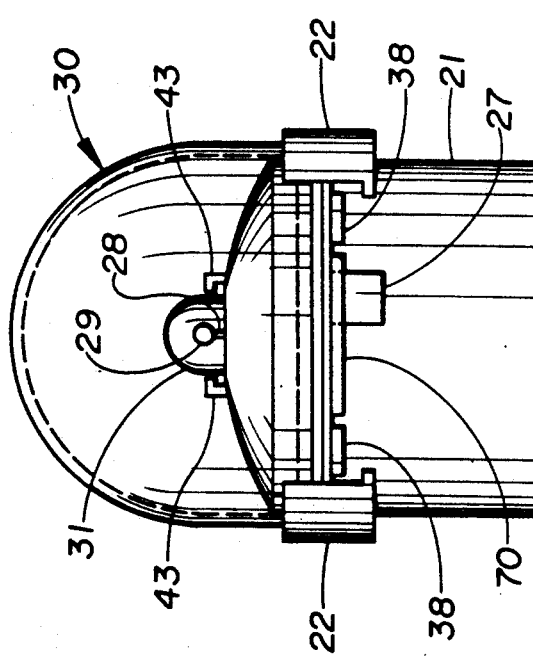
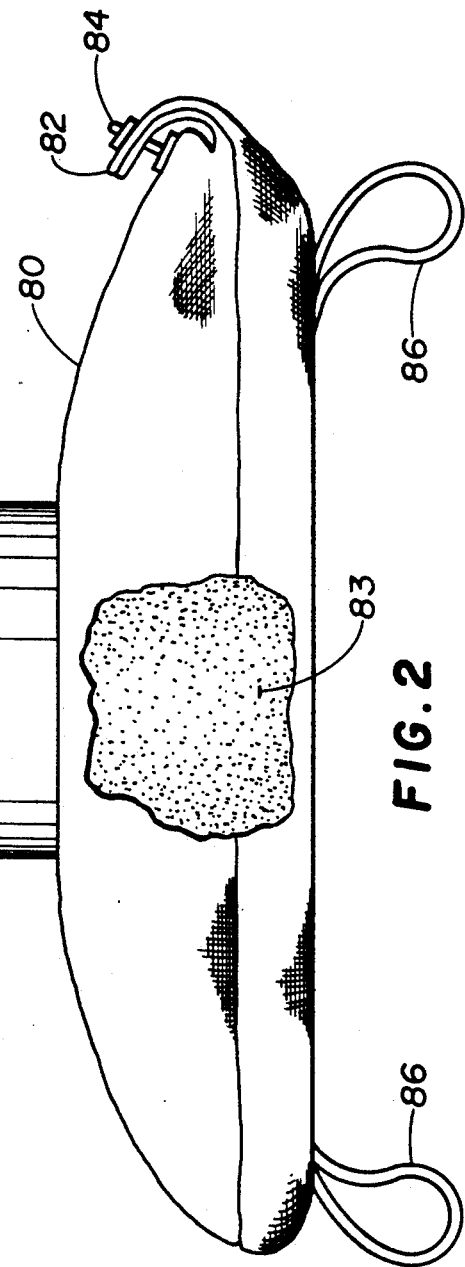

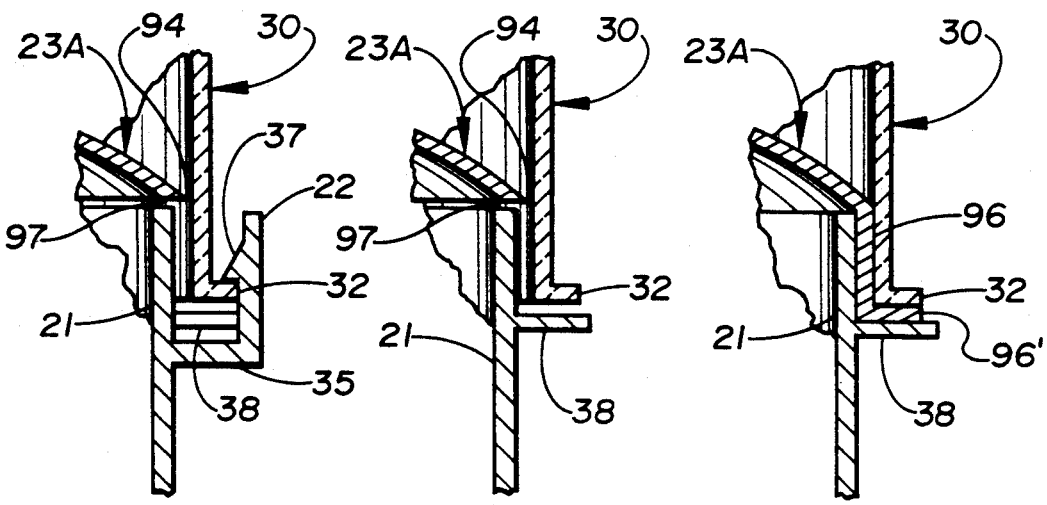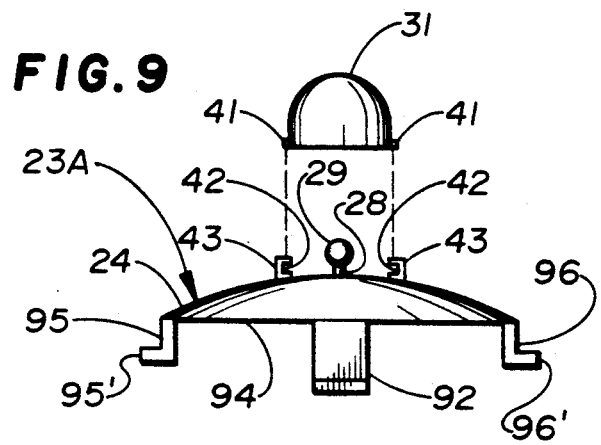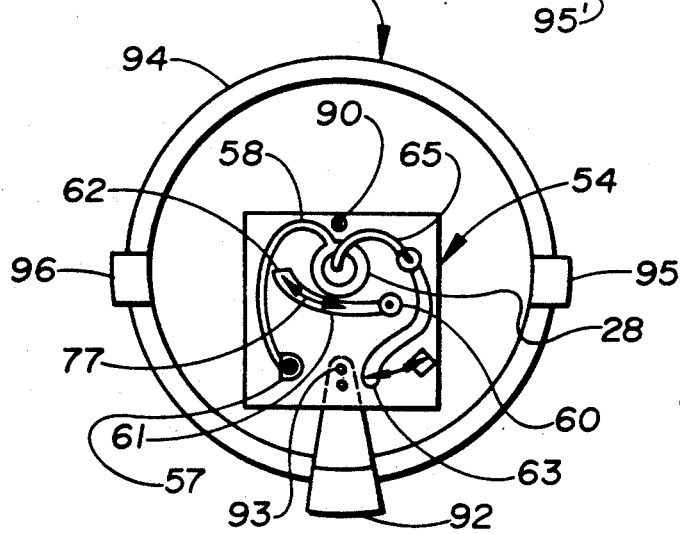

EMERGENCY LIGHT FOR MARKING OF AIRCRAFT LANDING SITES AND OTHER PURPOSES

FIELD OF THE INVENTION

The present invention relates to a marker light for temporary or emergency use in delineating the boundaries of safe aircraft landing areas, for marking roadways or obstructions or for other signaling purposes, generally of a temporary nature. More particularly, it relates to a self-contained, battery powered light, combined with an optional ballasted supporting base, which may be rapidly deployed on or near selected sites, as by tossing the light assembly from a moving vehicle.

BACKGROUND OF THE INVENTION

Marker lights of the type herein involved are used primarily by military forces in combat areas to mark the boundaries of safe aircraft landing areas or drop zones, to mark roadways or obstructions or for a variety of other signalling purposes where it is desirable to provide some visible indication of either safe or hazardous conditions, without requiring manned attendance. Such uses are usually of a temporary or emergency nature and conditions often require that the markers be easily transported then rapidly deployed with a minimum amount of attention to their secure and precise placement. Often, the marker lights are distributed by dropping the lights at intervals from a moving vehicle. Such a method requires that the marker lights be capable of erecting themselves to an operative position at or near their intended location and that they remain reasonably well fixed on site.

Marker lights designed specifically for such purposes are disclosed in U.S. Pat. No. 2,806,131, issued Sep. 10, 1957 and U.S. Pat. No. 4,563,668, issued Jan. 7, 1986 and in U.S. Military Specification MIL-L-52543C, dated Oct. 7, 1976, available from Commander, US Army Mobility Equipment Research and Development Command, ATTN: DRXFB-DS, Fort Belvoir, Va. 22060.

The marker lights disclosed in the above references comprise a cylindrical housing closed at the bottom end. The lower portion of the housing encloses a dry cell battery above which is mounted a three position switch and a printed circuit board supporting a lamp flasher circuit. The switch operating lever extends to the exterior of the housing and is covered by a rubber boot. The printed circuit board is covered by a dome-like light deflector extending completely across the housing and having a white or reflective finish with a lamp socket and lamp mounted centrally thereon. The lamp and light deflector dome are covered by a transparent protective dome which has an outwardly projecting flange at the open end in abutment with the upper edge of the cylindrical housing. The protective dome and the underlying deflector dome are secured in position closing the upper end of the cylindrical housing by an internally threaded ring that engages mating threads formed around the outer upper edge of the cylindrical housing. The ring has an inwardly directed flange at its upper edge which captures the flange of the protective dome, along with a sealing gasket, and draws the dome and light deflector into a tightly seated contact with the upper rim of the housing.

The lower, major portion of the light housing is inserted through the neck of a ballast bag, extending into the interior of the bag. Prior to assembly of &.he light housing to the ballast bag, the bag is substantially filled with any suitable and available ballast material, such as sand, stones, soil or ice. The bag is then closed by inserting the light housing through the bag neck and tightly clamping the edge of the bag neck against the light housing by means of a hose clamp or similar device. In certain marker lights of the prior art, the ballast bag includes, in addition to the opening through which the light assembly is inserted, one or more openings fitted with flap closures to permit filling the bag with ballast without disturbing the assemblage of the light housing to the ballast bag.

Prior marker lights of the type described are prone to certain failures and disadvantages. The primary cause of failure is damage to the light assembly housing and various parts of the light assembly resulting from impact cf the marker light with the ground when the light is dropped from a moving vehicle. Disadvantages of the prior marker lights include: difficulty in installing the light assembly into the filled ballast bag; impact damage to the light housing when the ballast comprises hard, sharp material, such as rocks; difficulty in filling the bag completely with ballast material because of the inaccessibility of areas of the bag in the vicinity of the light housing; loss in stability because of the reduced capacity of the bag for ballast material, due to the presence of the light housing; poor low temperature performance when the light housing is frozen into cold ballast material, such as ice; difficulty in adjusting the light dome for directional control when a partially blacked-out light dome is used and difficulty in changing the light color when lights of various colors are used. Other shortcomings of prior marker lights will become evident hereinafter.

It is an object of the invention to provide a marker light of the type described having improved immunity to damage resulting from the shock of deployment.

Another object of this invention is to reduce the maintenance time on the marker light. The switch contact is frequently subject to premature failure due to environmental factors such as hot humid climates and other factors such as the destructive vapors emitted by deteriorating batteries. Therefore, improved and rapid maintenance is achieved when the switch contact is a component of the cover or circuit so that it is quickly replaced as the appropriate one of these components is replaced.

Another object of this invention is to provide a more compact marker light.

It is a further object of this invention to provide a marker light that functions with less components.

It is another object of this invention to provide a marker light that can have its circuit and switch contact simultaneously replaced during maintenance of one of these components without the prior necessity of disconnecting the switch from the housing.

It is another object of the invention to provide a marker light having a ballasted supporting base in which the light assembly is isolated from direct contact with the ballast material thereby reducing the likelihood of damage to the light assembly by impact of the ballast material against the light assembly and reducing the possibility of deterioration of the light assembly by moisture seepage from the ballast material into the light assembly, should the light assembly housing be fractured during deployment, and improving cold weather performance by eliminating the possibility of the battery case being frozen into the ballast.

It is another object of the invention to provide a marker light having an optional supporting base in the form a bag having a reclosable opening to permit filling the bag with available ballast material in which the interior of the bag is not obstructed by the housing of the marker light thereby increasing the capacity of the bag for ballast material, improving the stability of the marker light and permitting the bag to be filled completely through a single opening.

It is another object of the invention to provide a ballasted marker light which is rainproof without the use of rubber seals, and in which the light circuit connections and switch are formed by a printed circuit board, eliminating jumper wires and a discrete switch and in which the light circuit is opened when the cover is removed from the battery housing, thus precluding accidental or inadvertent illumination of the lamp when the lamp housing is partially disassembled.

It is a further object of the invention to provide a marker light in which the lamp bulb can be easily replaced, the color of the light can be easily changed and the directivity of the light can be easily altered.

It is still another object of the invention to provide a marker light of simplified construction and reduced cost of manufacture.

Other objects and advantages of the invention will become apparent as an understanding thereof is gained from the following complete description and the accompanying drawings. Brief Description of the Invention Briefly, the marker light of the present invention comprises a marker light assembly having a cylindrical base portion closed at the bottom end and open at the top end which contains a battery compartment and storage space for spare lamp bulbs and bulb covers. The top end of the base portion is provided with three upwardly extending clamp arms spaced evenly about and spaced outward from the top rim of the base. A segmented flange extends outward from the top rim of the base near the lower ends of the clamp arms. The top end of the base is closed by a convex cover having a downwardly extending cylindrical rim with an outwardly projecting flange at the lower edge. The rim of the cover overlaps the top upper edge of the base.

A printed circuit board is mounted on the under side of the cover. The board includes a downwardly facing circuit pattern having contacts for engaging the battery terminals to connect the batteries either directly to the lamp for continuous illumination of the marker light or to an interrupter circuit through which the lamp receives intermittent power for flashing illumination of the marker light or for open circuiting the lamp. Thus, rotation of the cover with respect to the base orients the circuit board in three different azimuthal positions to perform the function of a three position switch having "on", "off" and "flash" positions. The cover is indexed to the base for proper orientation of the circuit board by an actuating arm which projects downward from the outer rim of the cover through a slotted flange extending outward from the upper end of the base.

A lamp socket, mounted on the upper surface of the board, projects through the center of the cover to receive a lamp. Components of the interrupter circuit are also mounted on the upper surface of the board. The lamp is optionally covered by a small translucent inner dome which may be colored with any of the conventional signal colors, such as red, green or amber.

The cover and inner dome are enclosed by a large, transparent outer dome which may be partially covered by an opaque finish so that the light will be visible only from a particular direction of approach. The lower rim of the outer dome is dimensioned to fit snugly over the cylindrical rim of the cover and is provided with an outwardly projecting flange which overlies and abuts against the flange of the cover. The outer dome is installed over the cover and the outer dome and cover are pressed down over the upper rim of the base until the flange of the outer dome is gripped by the clamp arms of the base. A secure assemblage of the cover and outer dome to the base is thus formed in which both the cover and the outer dome are relatively easily rotatable with respect to the base. The edge of the outer dome overlapping the upper rim of the base forms a rainproof seal without the use of a rubber gasket or a switch protective boot.

The marker light assembly can be used alone but is usually secured to the upper outer surface of a ballast bag, preferably by a pair of spaced rivets or removable nuts and screws passed through the bottom of the base of the light assembly and through the upper surface of the ballast bag. The bag may be suitably formed like a pillow case with an opening along one edge for inserting the ballast material, which may be closed by a zipper or snap fasteners or other suitable means. Tie down loops may also be attached to the corners of the bag for fixing the marker light in place by means of stakes or other suitable anchoring devices.

DESCRIPTION OF THE DRAWINGS

FIG. 2 is an elevation of a marker light constructed in accordance with a first embodiment of the invention, with a portion of the ballast bag thereof broken away to show the separation of the ballast from the light housing;

FIG. 2A is a sectional view, taken along the line 2A—2A of FIG. 3, of one of the clamp arms used to secure the cover and light dome to the light housing;

FIGS. 8A-8C are fragmentary sections of the upper portion the second embodiment of the invention taken along the lines 8A—8A, 8B—8B, and 8C—8C of FIG. 8, respectively;

FIG. 9 is an elevation of the cover of the marker light of the second embodiment of the invention; and FIG. 10 is a bottom view of the cover shown in FIG. 9.

DETAILED DESCRIPTION OF THE INVENTION

Figure 1:
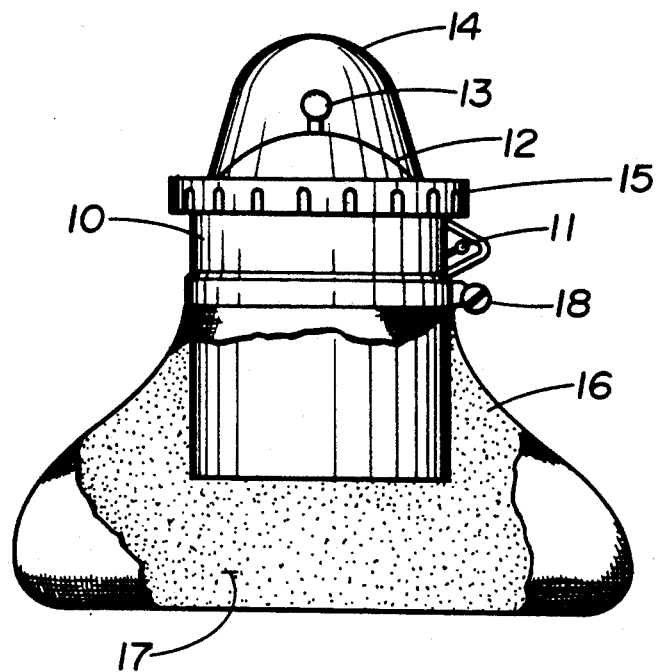
FIG. 1 is an elevation of a typical marker lamp of the prior art, with a portion of the ballast bag thereof broken away to show the seating of the light housing within the ballast.

FIG. 1 is an elevation of a typical marker light of the prior art. The marker light comprises a cylindrical housing 10 containing a battery, usually a 6 v. lantern battery, in the lower portion and a circuit board, for mounting the components of an interrupter circuit and spare bulb carriers, in the upper portion. A three-position toggle or slide switch is mounted in the upper portion of the housing with the operating lever 11 thereof projecting outward to enable the selection of "off", "on" or "flash" operation of the light. The housing is closed at the upper end by a convex light deflector 12, having a lamp socket and lamp 13 mounted in the center thereof, and by a transparent dome 14 which surrounds and extends over the light deflector and lamp. The light deflector 12 and dome 14 are secured to the housing by an internally threaded, flanged ring 15 and a sealing gasket (not seen) that abuts against a flange on the rim of the dome. The deflector 12, dome 14 and gasket are drawn tightly against the upper edge of housing 10 as the ring 15 is threaded down onto mating threads at the upper end of housing 10.

The lower portion of the housing 10 is fitted into the neck of a ballast bag 16, which is filled with any available ballasting material, where it directly contacts and becomes immersed in the ballast. The bag may be provided with an auxiliary opening with closure means for filling the bag with ballast, other than through the neck of the bag. The bag 16 is secured to the housing 10 by a hose clamp 18, or an equivalent, which tightly seals the neck of the bag to the housing.

Marker lights as shown in FIG. 1 are susceptible to damage from impact with the ground, which can occur when the lights are deployed by dropping them from a vehicle. The light is fairly tightly constrained, both against rotational and translational motion with respect to the ballast bag, and the light housing is in direct contact with the ballast. When the bag is impacted, forces are transmitted through the ballast to the light assembly, which can absorb only a small amount of the impact energy through inertial motion, and the light assembly may become overstressed at one or more points, resulting in breakage. Should a crack occur in the lower portion of the housing, the direct contact of the housing with the ballast permits moisture to seep from the ballast into the housing. The light dome 14 is tightly constrained about its rim by the ring 15, severely limiting &:he freedom of the dome to flex to relieve stress. If the dome is struck by a direct blow or is otherwise overstressed, the possibility of its fracture is thereby increased.

The light dome 14 is tightly secured to the housing 10 by the ring 15 and sealing gasket. If the light dome is partially blacked-out to control the directivity of the light and it is desired to change the direction from which the light is visible, it is necessary to loosen the ring to permit rotation of the dome relative to the housing and thereafter retighten the ring. Such an operation is time consuming and may expose personnel to hazards under combat conditions. The switch protective boot and the switch location both obscure the position of the switch lever so that, during battery replacement or o&her maintenance, the light may be reassembled with the switch in an operating position, which could lead to early battery failure or the inadvertent activation of the light under blackout conditions. Filling the ballast bag with chunky ballast, such as rocks, is difficult and unreliable because the battery housing obstructs the void at the back of the bag. Two openings may be provided in the bag on opposite sides of the housing, but this increases the time and effort of filling the bag, as well as the cost of manufacture.

No convenient means are provided for changing the color of the light. If the light color is to be changed, a light dome of the selected color must be substituted for the light dome then in use. No provision is made for insuring that light domes of various colors will be at hand continuously, as these must be carried separately from the marker light, thereby multiplying storage and supply problems.

The foregoing disadvantages and limitations of marker lights of the prior art are overcome by the marker light of the present invention, two embodiments of which will next be described with reference to FIGS. 2-10.

Figure 3:
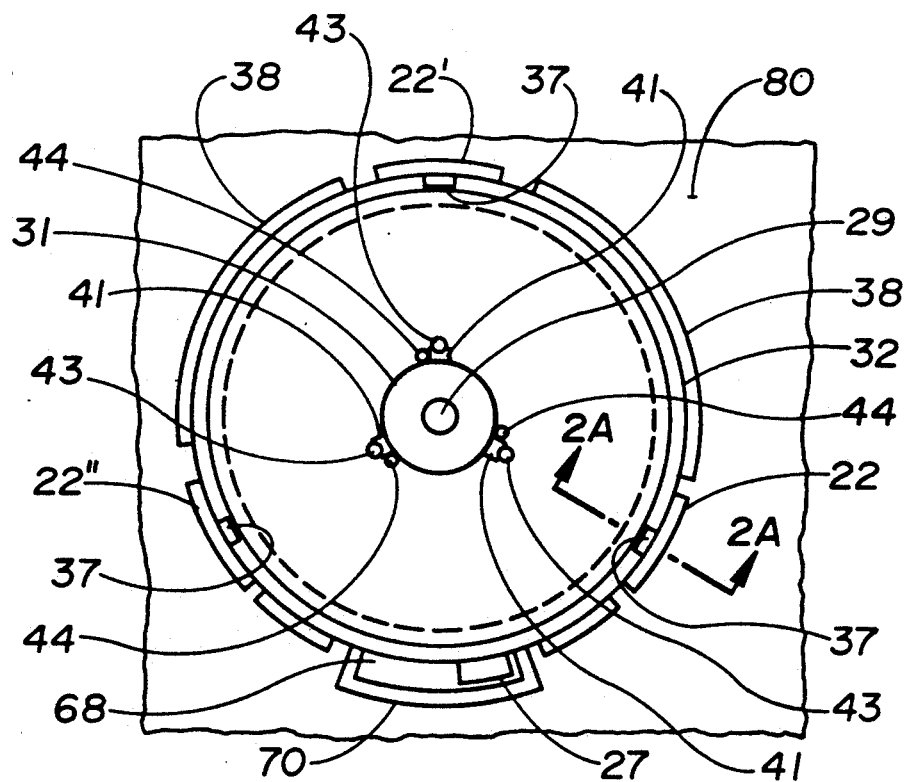
FIG. 3 is a top view of the marker light of the first embodiment of the invention.
Figure 4:
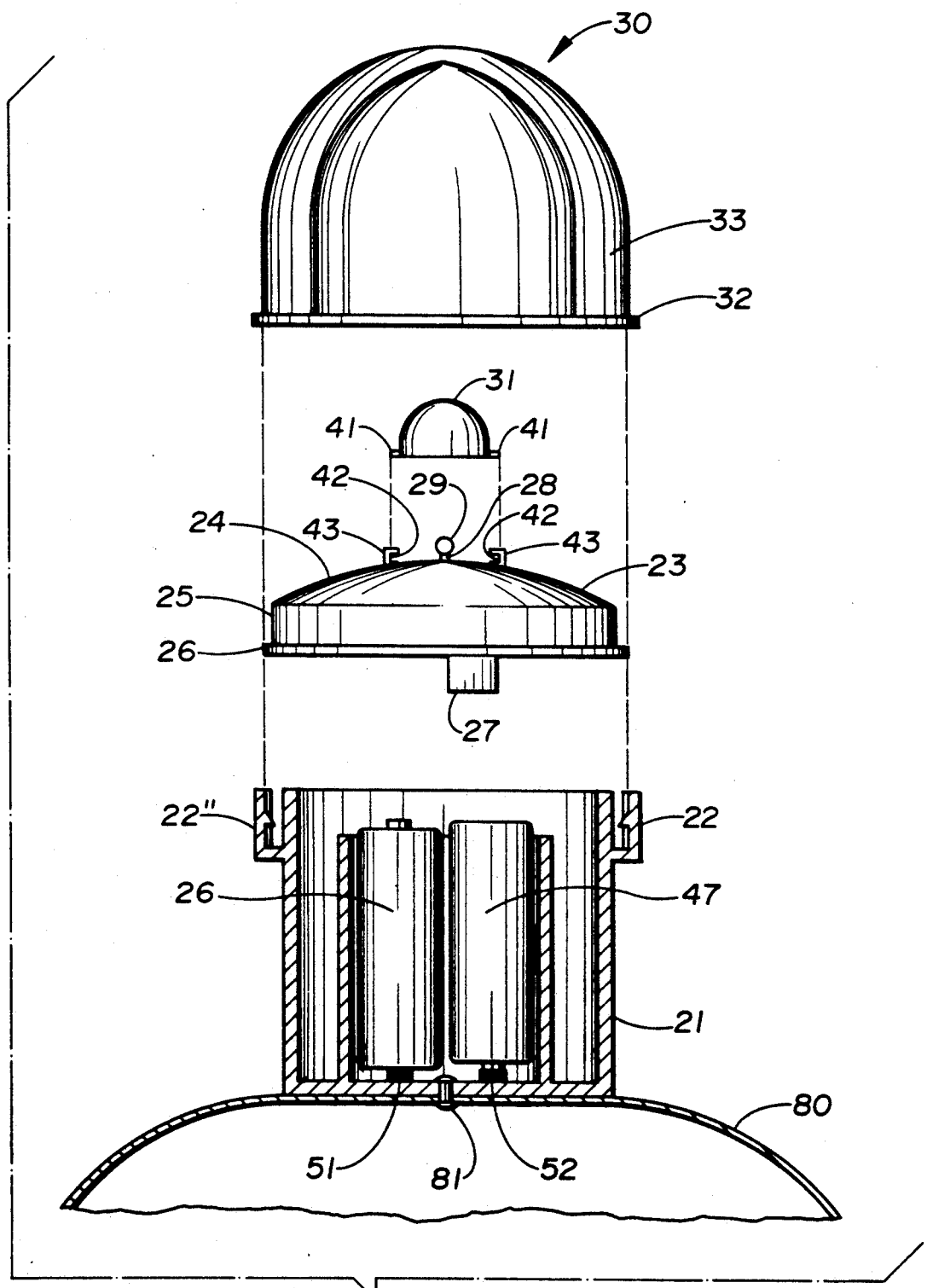
FIG. 4 is an exploded elevation of the first embodiment of the invention with the facing wall of the housing thereof broken away.

Referring to FIGS. 2, 3 and 4, the first embodiment of the marker light of the invention comprises a cylindrical housing 21 having three clamp arms 22, 22' and 22" evenly spaced about the upper end thereof. As best seen in FIG. 4, the housing 21 is closed at its upper end by a cover 23 formed with a convex upper surface 24 and a cylindrical rim 25 having an inner diameter dimensioned for a close rotational fit over the upper edge of housing 21. Rim 25 extends downward below the upper edge of housing 21 when assembled thereto. A circular flange 26 extends outward from the periphery of the lower edge of rim 25. An actuating arm 27, the purpose of which will later be described, projects from flange 26 and extends downward below the lower surface of the rim. A lamp socket 28 and lamp 29 project upward from the center of cover 23. The lamp 29 is covered by a transparent inner light dome 31 which may be either clear or colored with any of the conventional signal colors, such as red, green or amber. Cover 23 is finished with a white or similar light reflective surface.

A generally circular, transparent outer light dome 30 is superimposed over cover 23. The inner wall of the lower end of light dome 30 is cylindrical with a diameter dimensioned for a close rotational fit over the rim 25 of cover 23. An outwardly extending flange 32 encircles the lower periphery of dome 30. One or more portions of light dome 30 may be blacked-out with an opaque finish, as seen at 33, FIG. 4, so that the light may be seen only from a particular direction of approach.

Referring to FIGS. 2, 2A and 3, the clamp arms 22, 22' and 22" are formed with a horizontal arm 35 projecting outward from below the top edge of housing 21 and a vertical arm 36 extending upward to the level of the top edge of housing 21. A downwardly inclined ramp 37 projects inward from the inner surface of arm 36. A segmented flange 38 substantially encircles housing 21 at a level slightly above the level of the upper surface of arm 35 to serve as a stop when the cover 23 and the light dome 30 are fitted over housing 21 and to serve as a bearing surface when the cover or light dome is rotated relative to the housing. The distance separating the upper surfaces of flange 38 and the ledge at the end of ramp 37 is slightly greater than the combined thicknesses of flanges 26 and 32.

As best seen in FIG. 2A, the outer diameters and the widths of flanges 26 and 32 of the cover 23 and light dome 30 are such as to provide clearance between the edges of the flanges and the inner surface of arm 36. When the cover 23 and light dome 30 are fitted over the housing 21 and pressed down into place against flange 38, the clamp arms 36 are flexed outward by passage of the edges of flanges 26 and 32 over the ramps 37 until flange 32 passes over the ends of the ramps. At that point, arms 36 return to their original position and the cover and light dome are held in place by the upward thrust of the batteries within the housing 21 against the cover 23, as will later be more fully described. It is to be noted that the extension of the lower edge of light dome 30 below the upper edge of housing 21 effectively seals the housing against the entry of moisture from rain or other sources.

Referring to FIGS. 3 and 4, the inner light dome 31 is formed with three tabular flanges 41 equally spaced about the lower edge thereof. Dome 31 is seated over the lamp 29 and the dome is rotated to carry the tabs 41 through slots 42, formed on the inner sides of posts 43 upstanding from the surface of cover 23, and against the stops 44 (FIG. 3).

Figure 5:
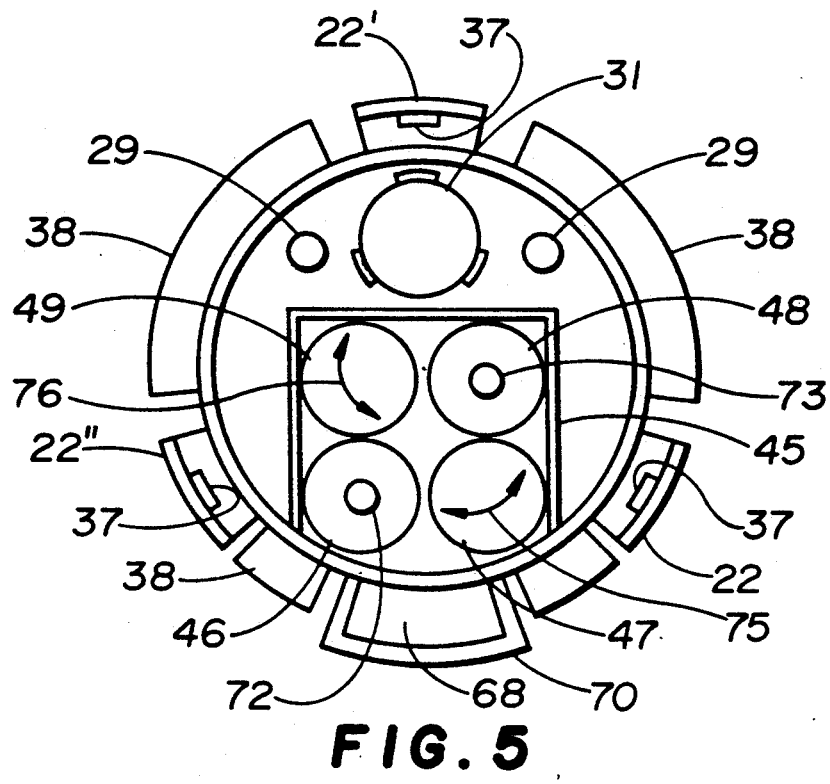
FIG. 5 is a top view of the housing of the marker light of the invention with the cover and light dome removed.

Referring to FIGS. 4 and 5, the housing 21 is partitioned to form an off center battery compartment 45 sized to contain four C-type alkaline dry cells 46–49. The vertical line passing through the center of gravity of said bottom of said housing is laterally spaced at least $\frac{1}{4}$ inch away from the vertical line passing through the center of gravity of said battery. Two leaf spring contacts 51, 52 are secured to the bottom of compartment 45 to connect, respectively, the negative terminal of cell 46 with the positive terminal of cell 49 and the positive terminal of cell 47 with the negative terminal of cell 48. In the space adjacent to compartment 45, the bottom of housing 21 is fitted with a holder (not seen) upon which are stacked inner light domes 31' of various colors, available for use at any time, and with holders (not seen) for spare lamp bulbs 29'.

Figure 6:
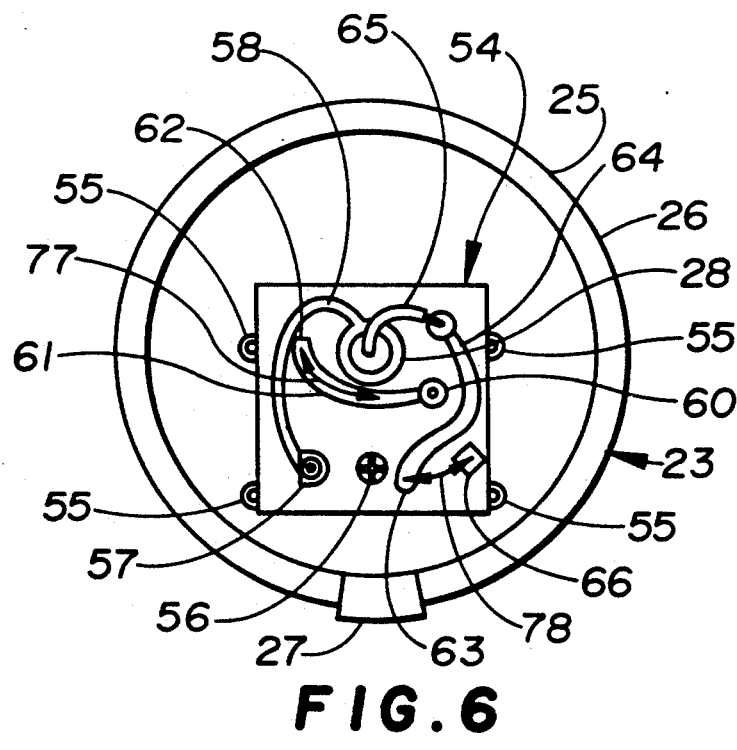
FIG. 6 is a bottom view of the cover for the housing of the first embodiment of the invention.

FIG. 6 is a bottom view of the cover 23 showing the printed circuit board 54 mounted on the underside thereof. The board 54 rests on four mounting posts 55, extending downward from the under surface of cover 23, and is secured to the cover by a mounting screw 56. The circuit pattern of board 54 includes a stud contact 57 connected by a conductive path 58 to the negative terminal of lamp holder 28; a stud contact 60 connected by a conductive path 61 to a contact pad 62; a contact pad 63 connected by a conductive path 64 and wire 65 to the positive terminal of lamp holder 28 and a contact pad 66 connected to components of an interrupter circuit (not seen) mounted on the upper surface of board 54. Interrupter circuits suitable for use herein are well known in the art. The end of the interrupter circuit opposite contact pad 66 is connected to the positive terminal of lamp holder 28.

When the cover 23 is fitted over the end of housing 21, spring contacts 51 and 52 thrust cells 46–49 upward so that stud contact 60 bears against the negative terminal of cell 49, contact pad 62 bears against the positive contact of cell 48, stud contact 57 bears against the negative terminal of cell 47 and the positive contact of cell 46 bears either against contact pad 63, contact pad 66 or a point between contact pads 63 and 66, depending upon the azimuthal angle of cover 23 with respect to housing 21. Cover 23 is indexed in azimuth with respect to housing 21 by actuating arm 27 which extends downward through the slot 68 of an index flange 70 (FIG. 5) projecting outward from near the upper end of housing 21. The cover 23 may be rotated with respect to the housing 21 through a limited arc, defined by the length of slot 68. During such travel, as actuating arm 27 is moved from the left end of slot 68 to the right end thereof, actuating arm 27 passes through three switch positions comprising "flash", "off" and "on". Indicia of these positions may be marked on the upper surface of flange 70.

With actuating arm 27 located at the left end of slot 68 in the "flash" position, the positive terminal 72 of cell 46 contacts contact pad 66; contact pad 62 contacts the positive terminal 73 of cell 48; contact 57 engages the upwardly facing surface of cell 47, comprising the cell negative terminal and contact 60 engages the upwardly facing surface of cell 49, also comprising the cell negative terminal. Cell 46 is connected in series with cell 49 by contact spring 51 and cell 47 is connected in series with cell 48 by contact spring 52. Thus all four cells are connected in series with the interrupter circuit and the lamp 29 for flashing operation of the lamp. The series circuit can be traced as follows: commencing with contact 57, the negative terminal of cell 47 and the negative terminal of lamp holder as the most negative point of potential, the circuit proceeds through the positive terminal of cell 47 and contact 52 into the negative terminal of cell 48; then from the positive terminal 73 of cell 48 through contact pad 62 and contact 60 into the negative terminal of cell 49; then from the positive terminal of cell 49 through contact 51 into the negative terminal of cell 46; then from the positive terminal 72 of cell 46 in contact pad 66 and through the interrupter circuit to the positive terminal of lamp 29.

When the cover 23 is rotated relative to the housing 21 through the arc defined by slot 68, contacts 57 and 60 travel across the negative terminals of cells 47 and 49 along the paths indicated by arrows 75 and 76, respectively, and contact pad 62 travels across the positive terminal 73 of cell 48 along the path indicated by arrow 77. Contact pads 66 and 63 travel across the positive terminal 72 of cell 46 along the path indicated by arrow 78. Throughout such travel, contacts 57 and 60 and contact pad 62 are in continuous contact with their associated negative and positive terminals of cells 47, 49. and 48. Contact pads 66 and 63 occupy three successive positions in moving from left to right, in which: the positive terminal 72 of cell 46 contacts pad 66 for "flash" operation of the lamp; positive terminal 72 lies intermediately between pads 66 and 63, turning the lamp off, and positive terminal 72 contacts pad 63 for continuously "on" operation of the lamp.

Referring to FIGS. 2 and 4, the marker light assembly is secured to the top surface of a ballast bag 80 by two aligned rivets 81 passed though the bottom of housing 21 along the center line thereof and through the upper layer of bag 80. Bag 80 is open along one edge thereof, forming a flap 82, to enable the filling of the bag with whatever ballast material 83 that may be available and suitable for the purpose. Any suitable fastening means, such as snap fasteners 84, as shown, a zipper or other means, may be used to secure flap 82 closed to prevent spillage of the ballast. The bag may be provided with tie-down loops 86 fixed to the corners of the bottom surface of the bag for anchoring the marker light in place.

FIGS. 7-10 illustrate a second embodiment of the invention which differs primarily from the embodiment described with reference to FIGS. 2-6 in the pivotal mounting of the circuit board 54 to the cover 23A, which is modified from the cover 23. The housing 21, the interior arrangement of housing 21, the outer light dome 30 and the inner light dome 31 are the same for both embodiments of the invention.

Figure 7:
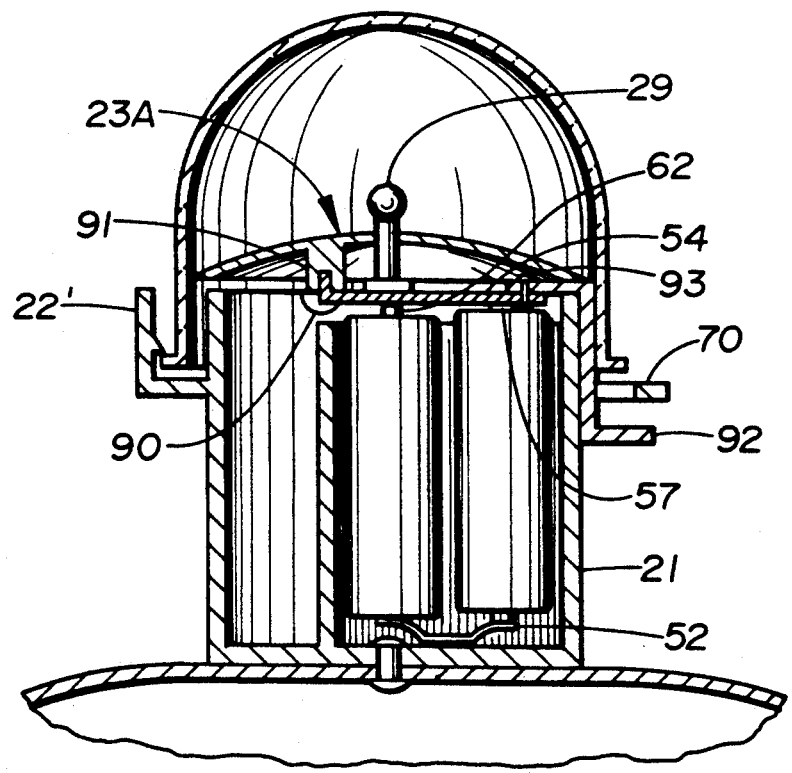
FIG. 7 is a vertical section of an assembled marker light constructed in accordance with a second embodiment of the invention.
Figure 8:
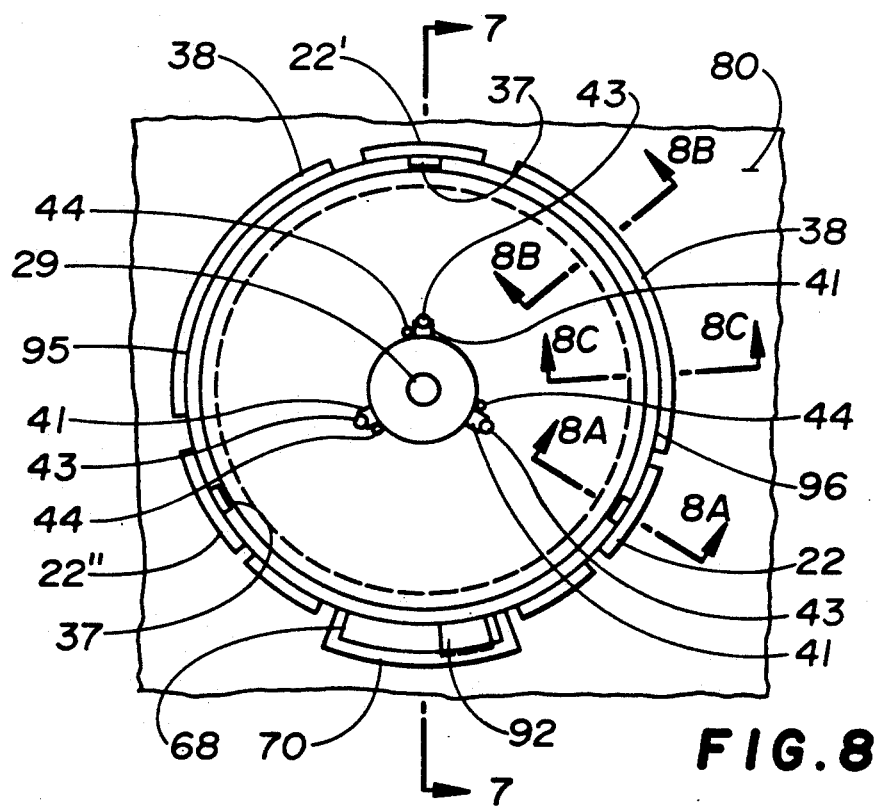
FIG. 8 is a top view of the second embodiment of the invention.

Referring to FIGS. 7 and 10, circuit board 54 is pivotally attached to the cover 23A by a mounting screw 90 passed through circuit board 54 near the edge thereof adjacent to the lamp holder 28. Screw 90 is seated in a mounting post 91 that depends from the inner surface of cover 23A and serves as a bearing point for board 54. An alternate actuating arm 92 is attached to board 54 near the edge thereof opposite screw 90, as by rivets 93 or other suitable fasteners. Alternate activating arm 92 extends outward over the top edge of housing 21 and downward along the outer surface of housing 21 parallel to the inner vertical wall of said dome through slot 68 of flange 70. In this embodiment, the actuating arm 92 is a discrete component with a vertical element wherein in the FIG. 4 embodiment, the vertical element of the actuating arm 27 is an integral part of rim 25 of the cover 23. Alternate activating arm 92 may be manipulated in the same manner as actuating arm 27 to establish the circuit connections of "on", "off" and "flash" to the lamp 29. In the first embodiment, the circuit board 54 and cover 23 rotated together to change circuit connections. In the second embodiment, cover 23A remains stationary while the board pivots relative to the cover to change circuit connections. The motion of circuit board 54 with respect to the batteries 46-49 is the same in both embodiments of the invention.

Cover 23A of the second embodiment is modified from cover 23 of the first embodiment to permit lever 92 to clear the cover 23A and extend to the exterior of housing 21. Referring particularly to FIGS. 9 and 10, cover 23A terminates in a circular outer edge 94 having a diameter substantially equal to the inner diameter of outer dome 30 at the lower end thereof. Two diametrically opposed legs 95, 96 extend vertically downward from the edge 94 of cover 23A. Flanges 95', 96' respectively extend horizontally outward from the lower ends of legs 95, 96. As seen in FIG. 8C, when the cover 23A and outer dome 30 are assembled to the housing 21, flange 32 abuts against flange 96', and similarly flange 95', to secure cover 23A against upward motion relative to the housing 21, while the vertical portions of legs 95, 96 are sandwiched between the inner surface of the lower end of dome 30 and the upper, outer surface of housing 21 to maintain the cover 23A in proper horizontal alignment with the housing 21. As seen in FIGS. 8A-8C, legs 95, 96 are of proper length to maintain a clearance space 97 between the edge 94 of cover 23A and substantially the entire periphery of the upper end of housing 21. The extension of lever 92 from the circuit board 54 through the clearance space 97 to the exterior of the housing 21 can be seen in FIG. 7.

The marker light of the invention has numerous advantages over marker lights of the prior art. The mounting of the marker light assembly to the ballast bag in the manner described has the advantage that the light assembly may rotate or translate, both horizontally and vertically, a limited amount, as permitted by the slack in the fabric of the ballast bag, to absorb through inertial motion the impact forces generated in dropping the marker light from a height. The off-center mounting of the batteries within the housing of the light assembly tends to promote such absorption of impact forces by the inertial rotation light assembly. The isolation of the light assembly from direct contact with the ballast material contained in the bag allows impact forces to be largely absorbed by displacement of the ballast material within the bag prior to the imparting of such forces to the light assembly and further prevents the seepage of moisture from the ballast material into the housing of the light assembly, should the housing become cracked during deployment of the marker lights. In situations where the ballast material used is snow or ice, the isolation of the housing from the ballast prevents the ballast from chilling the battery contained in the housing and degrading the performance of the marker light.

The construction of the printed circuit with switch terminals formed as an integral part and the mounting of the printed circuit board for relative motion with respect to the battery eliminates the costly switch used in prior marker lights. In the invention, the switch position is not obscured by a protective boot, as in prior marker lights. The marker light of the invention may be disassembled for battery replacement or other maintenance and then reassembled with assurance as to the switch position, thus precluding the possibility of inadvertently assembling the marker light with the switch in an operating position. The extension of the lower edge of the outer light dome below the upper edge of the housing effectively seals the housing against the entry of moisture while still permitting easy rotation of the cover and light dome relative to the housing.

The provision of the inner light dome and storage space for light domes of various colors enables the color of the marker light to be easily changed. The manner of mounting the cover and outer light dome to the housing of the light assembly improves the immunity of the light assembly to damage from direct blows and permits the ready adjustment of the light dome to control the directivity of the marker light.

Obviously, modifications and variations in the construction of the marker light of the invention are possible in the light of the above teachings. The invention may be practiced otherwise than as specifically disclosed without departing from the spirit and scope of the appended claims.

What is claimed is:

1. A marker light comprising:
   a light assembly including a housing, a battery contained in said housing, a lamp powered by said battery and a switch for controlling the flow of current from said battery to said lamp;
   a ballast bag having an opening therein to permit filling said bag with ballast material;
   means for releasably fastening said opening of said bag to prevent spillage of ballast material contained by said bag; and
   means for attaching an end of said housing to an external surface of said ballast bag to permit limited translational and rotational motion of said light assembly relative to said ballast material,
   whereby said housing does not protrude into said ballast bag, when impact forces imparted to said ballast bag and transmitted therethrough to said light assembly and impulse forces applied to said light assembly may be largely reduced by inertial motion of said light assembly relative to said ballast material.

2. A marker light as claimed in claim 1, wherein said housing is closed at a bottom end thereof, and said means for securing the entirety of said light assembly to said ballast bag further comprises at least one fastener passed through said bottom of said housing and through a top surface of said ballast bag.

3. A marker light as claimed in claim 1, wherein said housing of said light assembly is cup-shaped with a closed bottom end and an open top end, said light assembly further comprising, a cover for said open top end of said housing, means for mounting said lamp above an outer surface of said cover, a generally circular transparent light dome fitted over said cover and spaced away from said lamp, said light dome having a downwardly extending peripheral rim; and means for securing said light dome over said cover and said housing.

4. A marker light as claimed in claim 3, wherein said light dome rim extends below and encircles a top end rim of said housing for providing a rain-tight seal.

5. A marker light as claimed in claim 3, wherein a portion of said light dome is covered with an opaque finish so as to limit directions from which said lamp is visible.

6. A marker light as claimed in claim 3, wherein said securing means permits rotation of said light dome relative to said housing.

7. A marker light as claimed in claim 5, wherein said securing means permits rotation of said light dome relative to said housing while maintaining a raintight seal.

8. A marker light comprising:

a housing closed at a bottom end and open at a top end thereof;

a battery having at least one terminal contained within said housing;

a cover for closing said top end of said housing;

a lamp bulb mounted above an outer surface of said cover;

a transparent light dome with a generally circular peripheral rim, said light dome having opaque portions for limiting directions from which the marker light is visible;

means for releasably securing said light dome over said cover and said top of said housing, said means securing said light dome so that said peripheral rim extends below and encircles an upper edge of said housing, said securing means permitting rotation of said light dome relative to said housing;

circuit means for establishing a first electrical circuit between said lamp and said battery, said circuit means including, a switch means for energizing said lamp bulb, said switch means having at least one contact, an actuating arm extending to the exterior of said housing, said arm being movable into a first position to engage said contact and close said first electrical circuit and also being movable into a second position to disengage said contact and open said first electrical circuit.

9. A marker light comprising:

a housing closed at a bottom end and open at a top end thereof;

a battery having at least one terminal contained within said housing;

a cover for closing said top end of said housing;

a lamp bulb mounted above an outer surface of said cover;

a transparent light dome having a generally circular peripheral rim, said light dome having opaque portions which limit directions from which the marker light is visible;

seating means at said open top end of said housing for rotatably seating said peripheral rim of said transparent light dome;

means for releasably locking said peripheral rim within said seating means for maintaining a raintight seal while permitting said transparent light dome to the rotated; and circuit means for establishing a first electrical circuit between said lamp and said battery, said circuit means including, a switch means for energizing said lamp bulb, said switch means having at least one contact, an actuating arm extending to the exterior of said housing, said arm being movable into a first position for engaging said contact to close said first circuit and also being movable into a second position for disengaging said contact to open said first circuit.

10. A marker light comprising:

a housing closed at a bottom end and open at a top and thereof;

a battery having at least one terminal contained within said housing;

a cover for closing said top end of said housing;

a lamp bulb mounted above an outer surface of said cover;

a transparent light dome having a generally circular peripheral rim, means for releasably securing said light dome over said cover and said top of said housing;

circuit means for establishing a first electrical circuit between said lamp bulb and said battery, said circuit means including, a switch means for energizing said lamp bulb, said switch means having at least one contact;

an actuating arm movable into a first position for engaging said contact to close said first circuit and also being movable into a second position for disengaging said contact to open said first circuit, said actuating arm extending from the exterior of said housing and upward into the interior of said transparent light dome past the top of said peripheral rim.

11. A marker light comprising:

a housing closed at a bottom end and open at a top end thereof;

a battery having at least one terminal contained within said housing;

a cover for closing said top end of said housing;

a lamp bulb mounted above an outer surface of said cover;

a transparent light dome having a generally circular peripheral rim;

a means for releasably securing said light dome over said cover and said top of said housing, said securing means further comprising, at least one clamp arm attached to the exterior of said housing, said clamp arm including a flexible leg extending upward and having an upper end spaced from an outer surface of said housing, a locking member on an inner surface of the upper end of said leg facing the outer surface of said housing, said locking member bearing on the upper surface of said peripheral dome rim when said dome is secured to said housing;

circuit means for establishing a first electrical circuit between said lamp and said battery, said circuit means including, a switch means for energizing said lamp bulb, said switch means having at least one contact, an actuating arm extending exteriorly of said housing, said arm being movable into a first position for engaging said contact to close said first circuit and also being movable into a second position for disengaging said contact to open said first circuit.

12. A marker light comprising:

a housing closed at a bottom end and open at a top end thereof;

a battery having at least one terminal contained within said housing;

a cover for closing said top end of said housing;

a lamp bulb mounted above an outer surface of said cover;

a transparent light dome having a generally circular peripheral rim;

circuit means for establishing a first electrical circuit between said lamp and said battery, said circuit means including, a switch means for energizing said lamp bulb, said switch means having a first switch contact structurally supported by said cover, an actuating arm extending exteriorly of said housing, said arm being movable into a first position for engaging said contact to close said first circuit and also being movable into a second position for disengaging said contact to open said first circuit.

13. A marker light as described in claims 8, 9, 10, 11 or 12, wherein:

said circuit means further includes a circuit board having said first switch contact located thereon, said circuit board being movable to effect said switching.

14. A marker light as described in claim 13, wherein:

said circuit board is attached to the inside of said cover, and said actuating arm extends from said cover exteriorly of said housing for moving said cover and said circuit board to effect said switching.

15. A marker light as described in claim 13, wherein:

said circuit board is pivotally mounted to the inside of said cover, and said actuating arm extends from said circuit board to the exterior of said housing for rotating said circuit board to effect said switching.

16. A marker light as described in claim 8, 9, 10, 11 or 12, with additionally:

indicia means located on an exterior surface of said housing and adjacent the portion of said actuating arm extending exteriorly of said housing, said indicia means including a first distinctive marking denoting said first position of said actuating arm in which said first contact is in engagement with said terminal of said battery and said first circuit is closed, and a second distinctive marking denoting said second position of said actuating arm in which said first contact is out of engagement with said terminal of said battery and said first circuit is open.

17. A marker light as claimed in claim 12, further including:

second circuit means for establishing a second electrical circuit between said lamp and said battery, said second circuit means including:

a second switch contact for connecting said second circuit means to said lamp bulb, and said second circuit means further comprising an interrupter circuit having a first connection to said second contact and a second connection to said lamp bulb;

said actuating arm being further movable into a third position in which said second contact closes said second electrical circuit, said first contact being disengaged from said first circuit in said third position, both said first contact and said second contact being disengaged from their respective circuits in said second position of said actuating arm, and both said first circuit and said second circuit being open in said second position of said arm;

whereby said lamp bulb receives current intermittently through said interrupter when said actuating arm is in said third position and said second circuit is closed.

18. A marker light as described in claim 8, 9, 10, 11 or 12, further comprising:

a ballast bag having an opening therein to permit filling of said bag with ballast material, means for releasably fastening said opening of said bag to prevent spillage of ballast material contained by said bag; and means for securing said housing to an external surface of said ballast bag to permit limited translational and rotational motion of said housing relative to said ballast material.

19. A marker light as described in claim 8, 9, 10, 11 or 12, further comprising:

a ballast bag attached to said housing;

said battery being offset from a center axis of said housing to create an unbalanced center of gravity, whereby when said marker light is dropped, said housing pivots upon impact relative to said ballast bag to minimize impact forces on said housing.

20. A marker light as described in claim 8, 9, 10, 11 or 12, wherein said securing means further comprises:

a plurality of clamp arms attached to the exterior of said housing, said clamp arms each having a flexible leg extending upwardly and having an upper end spaced away from an outer surface of said housing, and a securing member on an inner surface of the upper end of said flexible leg, said securing members bearing on an upper surface of said peripheral dome rim when said dome is secured to said housing.

21. A marker light as claimed in claim 8, 9, 10, 11 or 12, with additionally:

a flange extending outward from the upper end of said housing, said flange positioned to limit movement of said actuating arm to define said first position when said cover is fitted to said housing.

22. A marker light comprising:

a housing closed at a bottom end and open at a top end;

a ballast bag attached to said bottom end of said housing;

a cover extending over said top end of said housing and closing said housing;

a lamp bulb projecting above the upper surface of said cover;

a first transparent dome extending over and completely enclosing the upper surface of said cover and said lamp bulb;

means for releasably securing said cover and said first transparent dome to the upper end of said housing; and a battery contained in said housing, said battery being offset from a center axis of said housing to create an unbalanced center of gravity, whereby when said marker light is dropped, said housing pivots upon impact relative to said ballast bag to minimize impact forces on said housing.

23. A marker light as claimed in claim 22, further comprising:

a second transparent dome positioned on an upper surface of said cover within said first transparent dome and enclosing said lamp bulb;

whereby said offset battery creates a storage compartment in said housing next to said battery for storing replacements for said second transparent dome.

24. A marker light as claimed in claim 22, with additionally:

a circuit board rotatably mounted in relation to said housing;

first and second contacts on said circuit board; and means separately connecting said first and second contacts to said lamp bulb;

said circuit board being mounted so that in a first rotational position relative to said housing, said first contact is connected to said battery for supplying a current continuously to said lamp bulb; and in a second rotational position of said circuit board relative to said housing, said first contact is disconnected from said battery for discontinuing said supply of current from said lamp bulb.

25. A marker light as claimed in claim 24, further including:

a second contact on said circuit board; and an interrupter circuit having one end thereof connected to said second contact and an opposite end thereof connected to said lamp bulb separately from the connection of said first contact to said lamp bulb, said second contact being positioned on said circuit board so that, in a third rotational position of said cover relative to said housing, said first contact is disconnected from said battery and said second contact is connected to said interrupter circuit for supplying current intermittently from said battery to said lamp bulb.

26. A marker light as claimed in claim 24, with additionally:

an actuating arm connected to said circuit board;

a flange extending outward from the upper end of said housing, said flange limiting a movement of said actuating arm when said cover is fitted to said housing, thereby limiting the rotation of said circuit board relative to said housing to define said first rotational position.

27. A marker light as claimed in claim 26, with additionally:

indicia means on the exterior of said housing, said indicia means having a distinctive marking for indicating said rotational position of said circuit board by a position of said actuating arm.

28. A marker light comprising:

a ballast bag having a sealable opening therein to permit filling said bag with ballast material;

a cylindrical housing closed at a bottom end and open at a top end, said housing having a battery compartment;

means for securing the bottom end of said housing to the upper outer surface of said ballast bag;

a battery contained in the battery compartment of said housing, said battery having at least two terminals;

a cover extending over said top end of said housing and closing said housing, said cover having a cylindrical rim extending downward from a periphery of said cover and below a top edge of said housing;

said rim completely encircling an upper end of said housing and being dimensioned for a close sliding fit with an outer surface of said housing;

a lamp bulb projecting above the upper surface of said cover;

a first transparent dome releasably secured to an upper surface of said cover so as to enclose said lamp bulb;

a second transparent dome extending over and completely enclosing the upper surface of said cover, said lamp bulb and said first transparent dome; and seating means for seating said cover and said second transparent dome at the upper end of said housing so as to permit rotation of said cover relative to said housing and rotation of said second transparent dome relative to said cover; and locking means for releasably and rotatably locking said light dome within said seating means thereby maintaining a raintight seal while permitting said transparent light dome to be rotated.

29. A marker light as claimed in claim 28, wherein:

said battery is positioned in said housing so that a vertical line passing through a center of gravity of the bottom end of said housing is laterally spaced from a vertical line passing through a center of gravity of said battery, thereby defining a storage compartment in said housing.

30. A marker light as claimed in claim 29, with additionally:

a circuit board secured to the underside of said cover in facing relationship to said terminals of said battery;

first and second contacts on said circuit board; and means separately connecting said first and second contacts to said lamp bulb;

said circuit board being positioned on the underside of said cover so that, in a first rotational position of said cover relative to said housing, said first and second contacts each engage separate ones of said terminals of said battery to supply current continuously to said lamp bulb; and in a second rotational position of said cover relative to said housing, at least one of said first and second contacts is disengaged from a terminal of said battery to discontinue supply of current to said lamp bulb.

31. A marker light as claimed in claim 30, further including:

a third contact on said circuit board; and an interrupter circuit having one end thereof connected to said third contact and the opposite end thereof connected to said lamp bulb separately from the connection of said first contact to said lamp bulb, said third contact being positioned on said circuit board so that, in a third rotational position of said cover relative to said housing, said first and third contacts engage separate ones of said battery terminals and said second contact is disengaged from a terminal of said battery, whereby said lamp bulb is supplied current intermittently from said battery through said interrupter circuit in said third rotational position of said cover.

32. A marker light as claimed in claim 31, with additionally:

an actuating arm on said cover and extending downward from the lower edge of said cover; and a flange extending outward from the upper end of said housing, said flange having a slot therein through which said actuating arm depends when said cover is fitted to said housing, a rotational position of said cover relative to said housing being defined by the travel of said actuating arm within said slot of said flange.

33. A marker light as claimed in claim 32, with additionally:

indicia means on the exterior of said housing, said indicia means having first, second and third distinctive markings for indicating, respectively, said first, second and third rotational positions of said actuating arm.

34. A marker light as claimed in claim 28, wherein:

said second transparent dome is covered, in part, by an opaque finish so as to limit the direction from which said light may be visible.

35. A marker light as claimed in claim 34, wherein:

said first transparent dome is tinted with a color selected from the group consisting of red, green and amber.

36. A marker light comprising:

a light assembly, said light assembly including, a cylindrical housing, said housing being closed at a bottom end and open at a top end thereof, said housing containing a battery compartment, a battery mounted in said battery compartment, said battery having at least two terminals accessible through said top end of said housing, a cover for said top end of said housing, said cover having a circular, convex upper surface extending completely over the said top end of said housing, a circular rim extending downward from the outer edge of said upper surface and a first flange projecting outward from the lower edge of said rim, said rim being dimensioned for a close sliding fit with the outer surface of the upper end of said housing, a lamp bulb centrally projecting above said upper surface of said cover, a circuit board mounted on the under surface of said cover, first and second contacts mounted on said circuit board for separately engaging said terminals of said battery in a first rotational position of said cover relative to said housing, at least one of said first and second contacts being disengaged from a terminal of said battery in a second rotational position of said cover relative to said housing, means on said circuit board for separately connecting said first and second contacts to said lamp bulb, a transparent inner light dome, means for releasably securing said inner light dome to said upper surface of said cover so as to enclose said lamp bulb, a transparent outer light dome having a second flange extending outward from the lower edge of said outer light dome, said outer light dome extending completely over and enclosing said rim of said cover and said inner light dome, said outer light dome being dimensioned for a close sliding fit with said rim of said cover, a lower surface of said second flange overlaying and abutting an upper surface of said first flange when said outer light dome is fitted over said cover;

a clamp arm fixed to the upper end of said housing for releasably securing said cover and said outer light dome over said top end of said housing so as to permit rotation of said cover relative to said housing, and to permit rotation of said outer light dome relative to said cover;

a ballast bag having a reclosable opening therein to permit filling said bag with available ballast material; and means for securing said bottom end of said housing of said light assembly to the upper, outer surface of said ballast bag so as to permit limited motion of said light assembly relative to said ballast bag.

37. A marker light as claimed in claim 36, wherein:

said battery is positioned in said housing so that a vertical line passing through a center of gravity of the bottom end of said housing is laterally spaced from a vertical line passing through a center of gravity of said battery, thereby defining a storage compartment in said housing.

38. A marker light as claimed in claim 36, wherein said clamp arm comprises:

a horizontal leg extending outward from the outer surface of said housing near said top end of said housing;

a vertical leg extending upward from the outer end of said horizontal leg and spaced away from the outer surface of said housing; and a ramp inclined inwardly toward said housing from the upper end of the surface of said vertical leg facing said housing, said clamp arm flexing away from said housing when said first flange of said cover and said second flange of said outer light dome pass along said ramp during fitting of said cover and outer light dome to said housing, said clamp arm returning to its original position when said first and second flanges pass over an end of said ramp so that the end of said ramp bears upon the upper surface of said second flange to secure both said cover and said outer light dome to said housing.

39. A marker light as claimed in claim 38, wherein said circuit board further includes:

a third contact; and an interrupter circuit having one end connected to said third contact and an opposite end connected to said lamp bulb separately from the connection of said first contact to said lamp bulb;

said third contact being positioned on said circuit board so that in a third rotational position of said cover relative to said housing said first contact and said third contact engage separate ones of said battery terminals and said second contact is disengaged from one of said battery terminals, said lamp bulb receiving current intermittently from said battery through said interrupter circuit in said third rotational position.

40. A marker light as claimed in claim 39, with additionally:
an actuating arm extending downward from the lower edge of said rim of said cover; and
a slotted flange extending outward from the outer surface of said housing at a level below the level of said first flange on said cover;
said actuating arm extending through said slot of said flange when said cover is fitted to said housing,
said slotted flange and said actuating arm limiting the rotational position of said cover relative to said housing between said first, said second and said third rotational positions.

41. A marker light as claimed in claim 40, with additionally:
indicia means on the exterior of said housing, said indicia means having first, second and third distinctive markings for indicating, respectively, said first, second and third rotational positions of said actuating arm.

42. A marker light as claimed in claim 41, wherein said housing additionally includes:
a storage compartment; and
means in said storage compartment for mounting a spare lamp bulb and additional ones of said inner light domes of various colors.

43. A marker light as claimed in claim 38, wherein said battery comprises:
a plurality of alkaline dry cells, said cells being connected in series, the negative terminal of the first of said series connected cells constituting one of said two terminals of said battery, the positive terminal of the last of said series connected cells constituting the other of said two terminals of said battery.

44. A marker light comprising:
a light assembly including a housing having a closed bottom end, a battery contained in said housing, a lamp powered by said battery and a switch for controlling the flow of current from said battery to said lamp;
a ballast bag having an opening therein to permit filling said bag with ballast material;
means for releasably fastening said opening of said bag to prevent spillage of ballast material contained by said bag;
at least one fastener passed through said bottom of said housing and through a top surface of said ballast bag for securing the entirety of said light assembly to an external surface of said ballast bag to permit limited translational and rotational motion of said light assembly relative to said ballast,
whereby impact forces imparted to said ballast bag and transmitted therethrough to said light assembly and impulse forces applied to said light assembly may be largely reduced by inertial motion of said light assembly relative to said ballast material.

45. A marker light as claimed in claim 44, wherein said light dome rim extends below and encircles a top end rim of said housing for providing a rain-tight seal.

46. A marker light comprising:
a housing closed at a bottom end and open at a top end thereof;
a battery having at least one terminal contained within said housing;
a cover for closing said top end of said housing;
a lamp bulb mounted above an outer surface of said cover;
a transparent light dome having a generally circular peripheral rim;
circuit means for establishing a first electrical circuit between said lamp and said battery, said circuit means including,
a circuit board attached to the inside of said cover and structurally supported thereby, said circuit board being movable,
a first switch means for selectively completing a first circuit in which said lamp bulb is energized, said switch means having a first switch contact located on said circuit board and moveable therewith into contact with a battery terminal to complete said first circuit,
an actuating arm extending exteriorly of said housing, said arm being movable into a first position for moving said circuit board to engage said switch contact and close said first circuit, and said arm also being movable into a second position for moving said circuit board to disengage said switch contact and open said first circuit.

47. A marker light as described in claim 46, wherein:
said circuit board is pivotally mounted to the inside of said cover, and
said actuating arm extends from said circuit board to the exterior of said housing for pivoting said circuit board to effect said switching.

48. A marker light as described in claim 46, further comprising securing means for releasably securing said light dome over said cover and said top of said housing, said securing means further comprising,
a plurality of clamp arms attached to the exterior of said housing, said clamp arms each having a flexible leg extending upwardly and having an upper end spaced away from an outer surface of said housing, and
a securing member on an inner surface of the upper end of said flexible leg, said securing member bearing on an upper surface of said peripheral dome rim when said dome is secured to said housing.

49. A marker light as claimed in claim 48, with additionally:
a flange extending outward from the upper end of said housing, said flange being provided with a slot and said actuating arm extending through said slot, whereby movement of said actuating arm is limited by said slot to define said first position.

50. A marker light comprising:
a housing closed at a bottom end and open at a top end;
a battery contained in said housing, said battery being located in said housing so that a vertical line passing through a center of gravity of said bottom end of said housing is laterally spaced from a vertical line passing through a center of gravity of said battery;
a cover extending over said top end of said housing and closing said housing;
a circuit board rotatably mounted in relation to said housing;
a first contact on said circuit board;
a lamp bulb projecting above the upper surface of said cover;

a first transparent dome positioned on an upper surface of said cover so as to enclose said lamp bulb;

a second transparent dome extending over and completely enclosing the upper surface of said cover, said lamp bulb and said first transparent dome; and means for releasably securing said cover and said second transparent dome to the upper end of said housing;

whereby said circuit board may be rotated to a first position relative to said housing wherein said first contact is connected to said battery for supplying a current continuously to said lamp bulb; and said circuit board may be rotated to a second rotational position relative to said housing wherein said first contact is disconnected from said battery for discontinuing said supply of current from said lamp bulb.

51. A marker light as claimed in claim 50, further including:

a second contact on said circuit board; and an interrupter circuit having one end thereof connected to said second contact and an opposite end thereof connected to said lamp bulb, said second contact being positioned on said circuit board so that, in a third rotational position of said circuit board relative to said housing, said first contact is disconnected from said battery and said second contact is connected to said interrupter circuit for supplying current intermittently from said battery to said lamp bulb.

52. A marker light as claimed in claim 50, with additionally:

an actuating arm connected to said circuit board; and a flange extending outward from the upper end of said housing, said flange being provided with a slot and said actuating arm passing through said slot, whereby movement of said actuating arm is limited by said slot to define said first position.

53. A marker light as claimed in claim 52, with additionally:

indicia means on the exterior of said housing, said indicia means having a distinctive marking for indicating said rotational position of said circuit board by said position of said actuating arm.

54. A marker light comprising:

a ballast bag having a sealable opening therein to permit filling said bag with ballast material;

a cylindrical housing closed at a bottom end and open at a top end, said housing having a battery compartment;

means for securing the bottom end of said housing to the upper outer surface of said ballast bag;

a battery contained in the battery compartment of said housing, said battery being positioned in said housing so that a vertical line passing through a center of gravity of the bottom end of said housing is laterally spaced from a vertical line passing through a center of gravity of said battery, thereby defining a storage compartment in said housing, and said battery having at least two terminals;

a cover extending over said top end of said housing and closing said housing;

said cover having a cylindrical rim extending downward from a periphery of said cover and below a top edge of said housing, said rim completely encircling an upper end of said housing and being dimensioned for a close sliding fit with an outer surface of said housing;

a lamp bulb projecting above the upper surface of said cover;

a circuit board secured to the underside of said cover in facing relationship to said terminals of said battery;

first and second contacts on said circuit board, said contacts being separately connected to said lamp bulb;

a first transparent dome releasably secured to an upper surface of said cover so as to enclose said lamp bulb;

a second transparent dome extending over and completely enclosing the upper surface of said cover, said lamp bulb and said first transparent dome; and means for releasably securing said cover and said second transparent dome to the upper end of said housing so as to permit rotation of said cover relative to said housing and rotation of said second transparent dome relative to said cover;

whereby, in a first rotational position of said cover relative to said housing, said first and second contacts each engage separate ones of said terminals of said battery to supply current continuously to said lamp bulb, and in a second rotational position of said cover relative to said housing, at least one of said first and second contacts is disengaged from a terminal of said battery to discontinue supply of current to said lamp bulb.

55. A marker light as claimed in claim 54, further including:

a third contact on said circuit board; and an interrupter circuit having one end thereof connected to said third contact and the opposite end thereof connected to said lamp bulb separately from the connection of said first contact to said lamp bulb, said third contact being positioned on said circuit board so that, in a third rotational position of said cover relative to said housing, said first and third contacts engage separate ones of said battery terminals and said second contact is disengaged from a terminal of said battery, whereby said lamp bulb is supplied current intermittently from said battery through said interrupter circuit in said third rotational position of said cover.

56. A marker light as claimed in claim 55, with additionally:

an actuating arm on said cover and extending downward from the lower edge of said cover; and a flange extending outward from the upper end of said housing, said flange having a slot therein through which said actuating arm depends when said cover is fitted to said housing, a rotational position of said cover relative to said housing being defined by the travel of said actuating arm within said slot of said flange.

57. A marker light as claimed in claim 56, with additionally:

indicia means on the exterior of said housing, said indicia means having first, second and third distinctive markings for indicating, respectively, said first, second and third rotational positions of said actuating arm.

58. A marker light as claimed in claim 54, wherein:

said second transparent dome is covered, in part, by an opaque finish so as to limit the direction from which said light may be visible.

59. A marker light as claimed in claim 58, wherein:

said first transparent dome is tinted with a color selected from the group consisting of red, green and amber.

* * * * *